United States Patent
Seel

(10) Patent No.: US 8,989,931 B2
(45) Date of Patent: Mar. 24, 2015

(54) METHOD AND DEVICE FOR CONTROLLING THE IDLE SPEED IN A HYBRID VEHICLE

(75) Inventor: Andreas Seel, Bonn (DE)

(73) Assignee: Robert Bosch GmbH, Stuttgart (DE)

( * ) Notice: Subject to any disclaimer, the term of this patent is extended or adjusted under 35 U.S.C. 154(b) by 399 days.

(21) Appl. No.: 13/514,665

(22) PCT Filed: Oct. 15, 2010

(86) PCT No.: PCT/EP2010/065532
§ 371 (c)(1),
(2), (4) Date: Aug. 20, 2012

(87) PCT Pub. No.: WO2011/069726
PCT Pub. Date: Jun. 16, 2011

(65) Prior Publication Data
US 2012/0303197 A1 Nov. 29, 2012

(30) Foreign Application Priority Data
Dec. 8, 2009 (DE) .......................... 10 2009 047 618

(51) Int. Cl.
G06F 17/00 (2006.01)
F02P 5/15 (2006.01)
B60W 20/00 (2006.01)
B60K 6/48 (2007.10)
B60W 10/06 (2006.01)
B60W 10/08 (2006.01)

(52) U.S. Cl.
CPC .................. *B60K 6/48* (2013.01); *B60W 10/06* (2013.01); *B60W 10/08* (2013.01); *B60W 20/00* (2013.01); *B60L 2240/421* (2013.01); *B60L 2240/423* (2013.01); *B60L 2240/425* (2013.01);
(Continued)

(58) Field of Classification Search
CPC ..... B60W 10/06; B60W 10/08; B60W 20/00; B60W 20/20; B60W 20/10; B60W 2710/081; Y02T 10/48; H02P 21/0003; H02P 6/06
See application file for complete search history.

(56) References Cited

U.S. PATENT DOCUMENTS 4,335,429 A * 6/1982 Kawakatsu ................... 701/102
6,687,582 B1 * 2/2004 De La Salle et al. ........... 701/22
(Continued)

FOREIGN PATENT DOCUMENTS

DE 10 2007 016513 10/2008
DE 10 2007 016514 10/2008
(Continued)

OTHER PUBLICATIONS

International Search Report, PCT International Application No. PCT/EP2010/065532, dated Apr. 6, 2011.

*Primary Examiner* — James Trammell
*Assistant Examiner* — Demetra Smith-Stewart
(74) *Attorney, Agent, or Firm* — Kenyon & Kenyon LLP

(57) ABSTRACT

A method for controlling the idle speed in a hybrid vehicle in which at least two power plants contribute together or separately to driving the hybrid vehicle, and a setpoint value is compared to an actual value for controlling the idle speed, the setpoint rotational speed being set as a function of the comparison by changing at least one intensification factor of the control. To adapt the control dynamics to the actual transmission characteristics of the first of the two power plants, the idle speed control for the at least two power plants is carried out simultaneously, the at least one intensification factor being continuously adapted to the power output of a first of the two power plants.

16 Claims, 2 Drawing Sheets

(52) U.S. Cl.
CPC .... *B60W2510/083* (2013.01); *B60W 2510/087* (2013.01); *B60W 2510/244* (2013.01); *B60W 2710/0644* (2013.01); *B60W 2710/065* (2013.01); *B60W 2710/081* (2013.01); *Y02T 10/6221* (2013.01); *Y02T 10/6286* (2013.01); *Y02T 10/642* (2013.01)
USPC .......... 701/22; 701/102; 123/339.11; 477/15; 180/65.28

(56) References Cited

U.S. PATENT DOCUMENTS

| | | | | |
|---|---|---|---|---|
| 6,984,957 | B2 * | 1/2006 | Tajima et al. | 318/400.02 |
| 2002/0163199 | A1 * | 11/2002 | Ramaswamy et al. | 290/40 C |
| 2003/0098010 | A1 * | 5/2003 | Kustosch | 123/339.11 |
| 2004/0060535 | A1 * | 4/2004 | Osawa et al. | 123/198 DB |
| 2007/0246273 | A1 * | 10/2007 | Tenbrock et al. | 180/65.2 |
| 2008/0188346 | A1 * | 8/2008 | Sugai et al. | 477/15 |
| 2008/0236912 | A1 * | 10/2008 | Ueoka et al. | 180/65.2 |
| 2009/0143188 | A1 * | 6/2009 | Soliman et al. | 477/5 |
| 2010/0274423 | A1 * | 10/2010 | Seel et al. | 701/22 |
| 2010/0282208 | A1 * | 11/2010 | Pursifull et al. | 123/339.11 |
| 2013/0204478 | A1 * | 8/2013 | Watanabe et al. | 701/22 |

FOREIGN PATENT DOCUMENTS

| | | |
|---|---|---|
| DE | 10 2007 061231 | 6/2009 |
| GB | 2 455 177 | 6/2009 |

\* cited by examiner

METHOD AND DEVICE FOR CONTROLLING THE IDLE SPEED IN A HYBRID VEHICLE

FIELD OF THE INVENTION

The present invention relates to a method for controlling the idle speed in a hybrid vehicle in which at least two power plants contribute together or separately to driving the hybrid vehicle, and a setpoint value is compared to an actual value for controlling the idle speed, the setpoint rotational speed being set as a function of the comparison by changing at least one intensification factor of the control, as well as a to device for carrying out the method.

BACKGROUND INFORMATION

Vehicles, which have a hybrid drive structure, have an internal combustion engine and in most cases an electric motor as the second power plant. The driving torque may thus be generated by both power plants during the driving operation of the hybrid vehicle.

In order to maintain the minimum rotational speed, internal combustion engines have an idle speed controller which compares a setpoint rotational speed with an actual rotational speed and generates a controller torque from this comparison, which sets the setpoint rotational speed. The control includes intensification factors which are adapted to the particular engine in an application operation. According to the state of the particular controlled system, which is formed by the drivetrain, the engine, and the vehicle, different intensification factors, which are available as parameter sets, are selected depending on whether the internal combustion engine is warm or cold or is operated in the first or a different gear. Higher intensification factors improve the dynamics of the idle speed controller. However, if they are too high, oscillations of the controller output signal may occur, thus resulting in an instability of the control.

In hybrid vehicles, the electric motor has significantly higher dynamics when building up and reducing the torque, which is output by the electric motor, than the internal combustion engine. However, it must be taken into account that for idle speed control the electric motor outputs only a limited torque or none at all, which is, for example, due to the fact that the high voltage battery supplying the electric motor with energy is empty, or overheating of the electric motor takes place. Therefore, the control intensification factors in the idle speed controller of the hybrid vehicle are selected to be only high enough to achieve a stable idle speed without the support by the electric motor. Adding other parameter sets which indicate during the idle speed control of the internal combustion engine that the electric motor has failed, for example "cold internal combustion engine with support of the electric motor," or "cold internal combustion engine without the support of the electric motor," would double the parameter sets of the internal combustion engine and is therefore very complex.

SUMMARY

An example method according to the present invention for controlling the idle speed in a hybrid vehicle may have the advantage that the control dynamics is adapted to the actual transmission characteristics of the first of the two power plants. Due to the fact that the idle speed control for the two power plants is carried out simultaneously, whereby the at least one intensification factor is continuously adapted to the power output of a first of the two power plants, the idle speed control of the two power plants is gradually transformed into a sole idle speed control of the second power plant, if the power output of the first of the two power plants decreases. Thus, depending on the operating state of the two power plants, an optimal stable idle speed control is set at all times, the dynamics of the first of the two power plants being taken into account depending on its power output or transmission characteristics. By taking into account the intermediate states of the power output of the first power plant, a high stability of the control is always achieved and an oscillation of the output signal of the idle speed controller is reliably prevented.

The idle speed control advantageously includes multiple intensification factors, one intensification factor being continuously adapted to the power output of the first of the two power plants. This adaptation always ensures an optimal compromise between the control dynamics and the stability of the output signal of the idle speed controller.

In one embodiment, all intensification factors are simultaneously continuously adapted to the power output of the first of the two power plants. This is possible due to a simple transformation of the output signal of the idle speed controller, since all intensification factors of the control are included into the output signal. Complex calculations with regard to influencing only one single intensification factor can be dispensed with.

In one refinement, the idle speed control includes a proportionally active transmission element, an integrally active transmission element, and a differentially active transmission element, one independent intensification factor being provided for each transmission element. From the control aspect, a variety of states may be set using these different transmission elements.

Advantageously, the intensification factor is applied with an idle speed control factor for controlling the idle speed. The idle speed control factor represents the dynamics losses in the case of a power drop of the first of the two power plants. With the aid of the idle speed control factor, the control dynamics is taken back only to the extent required by the power drop of the first of the two power plants. The control factors for the different states of the second power plant are not affected thereby.

In one embodiment, the idle speed control factor is the smaller, the lower the power output of the first of the two power plants is. The idle speed control factor is correctly determined by measuring the transmission characteristics of the controlled system, the controlled system including the two power plants. The factor is reduced to the same extent as the transmission characteristics of the controlled system deteriorates.

A particularly simple setting of the idle speed control characteristics is achieved in that the intensification factor for controlling the idle speed is multiplied by the idle speed control factor for the first power plant. Due to such multiplication, a smooth, since continuous, adaptation of the idle speed control intensification factors to the instantaneous power output of the first of the two power plants is possible, every operating state of the first of the two power plants being taken into account in the idle speed control.

In one refinement, the idle speed control factor decreases linearly with the power output of the first of the two power plants. Here, a first value of the idle speed control factor is associated with the full power output of the first power plant, while a second value of the idle speed control factor indicates the missing power output of the first power plant. Intermediate values of the power output of the first of the two power plants then correspond to values of the idle speed control factor which result linearly between the first and the second values of the idle speed control factor.

Alternatively, the idle speed control factor results from a characteristics curve which includes an instantaneously maximally available power output of the first of the two power plants as the input value. With the aid of such a characteristics curve, non-linear correlations between the power output and the idle speed control factor may be represented particularly well. This is always of particular interest if other influencing factors, which have an influence on the power output of the first of the two power plants, are to be taken into account, as well, when determining the idle speed control factor.

The two power plants are advantageously designed as an internal combustion engine and an electric motor; the power output of the electric motor varies. Since the electric motor has a higher control dynamics, i.e., it responds faster to a control signal, than the internal combustion engine, the electric motor's control dynamics is fully exploited in the idle speed control if it runs at maximum power output. With the aid of the idle speed control factor, the control dynamics of the electric motor is taken back only to the extent required by the reducing power output of the electric motor.

In the case of a power output reduction, the electric motor still contributes to the control of the idle rotational speed.

In one refinement, the instantaneously available torque of the electric motor is measured as the available power output, and the idle speed control factor is determined as a function of the instantaneously measured torque. By measuring the torque, the power output of the electric motor is continuously determined, an idle speed control factor being assigned to every measured value, thus allowing the intensification factors and the control to be continuously set.

In one embodiment, a temperature of the electric motor and/or an instantaneously available current of the high voltage battery supplying the electric motor is/are used as an input value of the characteristics curve. In this way, parameters which influence the power output of the electric motor are also taken into account in the idle speed control. In the case of an empty battery or overheating of the electric motor, the electric motor no longer outputs power and is thus not available for the idle speed control.

Another refinement of the present invention relates to an example device for controlling the idle speed in a hybrid vehicle in which at least two power plants contribute together or separately to driving the hybrid vehicle, and a setpoint value is compared to an actual value for controlling the idle speed, the setpoint rotational speed being set as a function of the comparison by changing at least one intensification factor of the control. To adapt the control dynamics to the actual transmission characteristics of the first of the two power plants, an arrangement is provided which allow the idle speed control to be carried out simultaneously for the at least two power plants, the at least one intensification factor of the control being continuously adapted to the power output of the first of the two power plants. Thus, an optimal and stable idle speed control is made possible for different power outputs of the first of the two power plants, and the idle speed control is continuously adapted to the particular power output state of the first power plant. It is ensured that the control dynamics of the idle speed controller is continuously taken back only to the extent to that the power output of the first power plant decreases. It is thus ensured during all states that the possible system dynamics is fully exhausted, but the stability of the control is still ensured. The driver notices this in the form of a stable, oscillation-free idle speed control of the hybrid vehicle.

Advantageously, a controller, preferably a PID controller, is provided which jointly carries out the control of the idle speed of the first and the second power plants. With the aid of just one controller, the idle speed control of the first and the second power plants is carried out simultaneously. A second controller and a necessary coordination between the two controllers may be dispensed with, whereby a cost-effective approach is achieved.

In one embodiment, the idle speed controller is an integral part of a control unit which measures a power output of the first of the two power plants, whose power output varies. Thus, all regulation and control processes necessary for the two power plants are combined in only one single control unit.

In one refinement, the first power plant, whose power output varies, is designed as an electric motor; the second power plant is an internal combustion engine. Since the electric motor has a higher control dynamics than the internal combustion engine, it contributes in every power state to the dynamics in the idle speed control.

The present invention permits numerous specific embodiments. One of these specific embodiments is explained in greater detail below on the basis of the figures.

DETAILED DESCRIPTION OF EXAMPLE EMBODIMENTS

Figure 1:
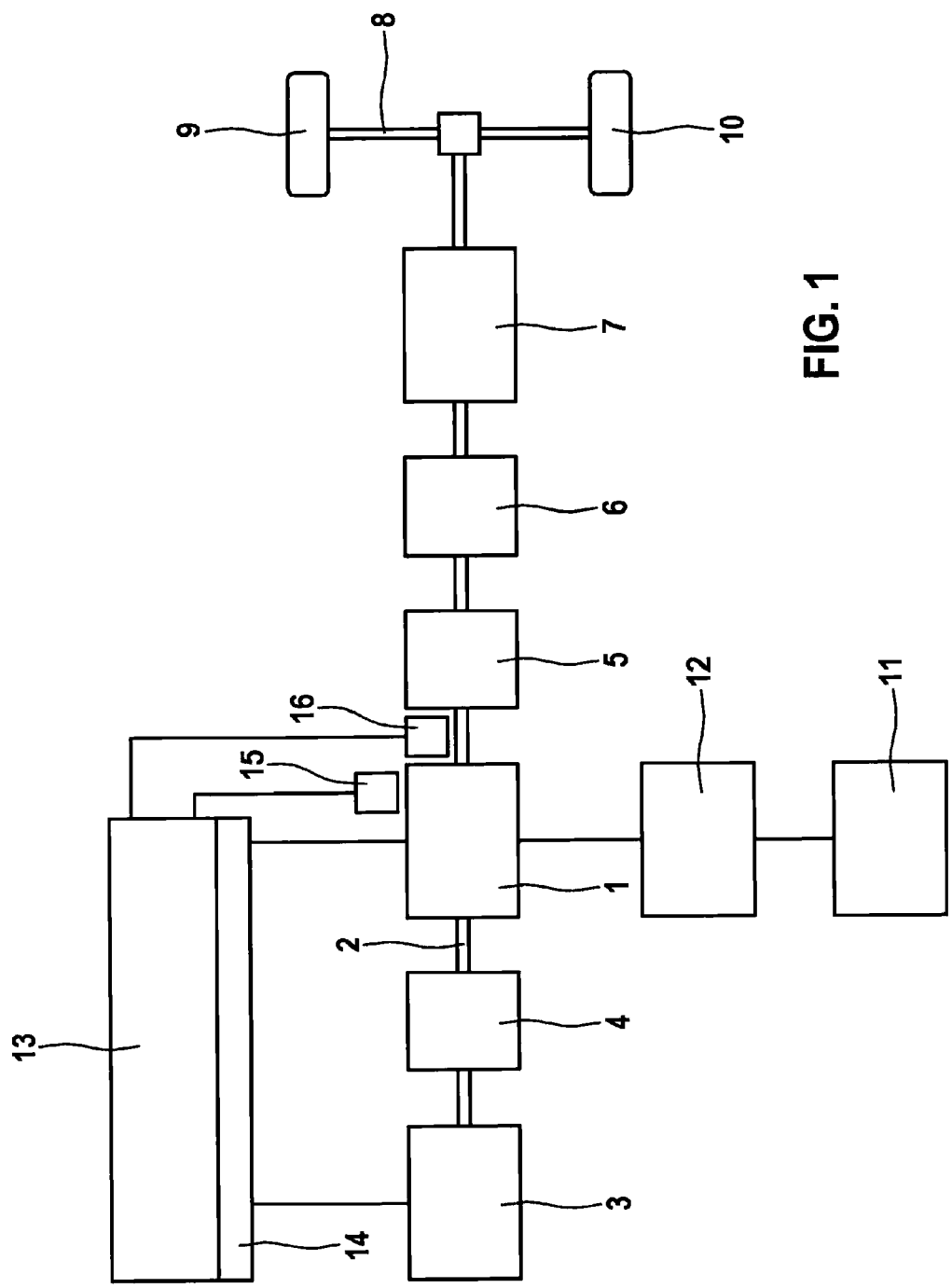
FIG. 1 shows a schematic representation for a hybrid vehicle designed as a parallel hybrid.

Identical features are identified by identical reference numerals.

FIG. 1 shows a hybrid vehicle designed as a parallel hybrid. In this embodiment, an electric motor 1 is situated on drive shaft 2 of an internal combustion engine 3. Internal combustion engine 3 is connected to electric motor 1 via a separating clutch 4. Electric motor 1 is guided via a starting clutch 5 to a torque converter 6, which is connected to a transmission 7. Transmission 7 is guided to an axle 8 at which wheels 9, 10 are situated which are driven by the described drivetrain.

Electric motor 1 is supplied with energy by a high voltage battery 11 which is connected to electric motor 1 via an inverter 12. Electric motor 1 and internal combustion engine 3 are controlled by a control unit 13. Control unit 13 includes an idle speed controller 14 which simultaneously controls the idle speed of internal combustion engine 3 and of electric motor 1.

There are various areas of operation in which a parallel hybrid may be operated. A first area of operation, in which separating clutch 4 is disengaged and internal combustion engine 3 is separated from the drivetrain and automatically stopped, is referred to as eDrive, since the hybrid vehicle is driven purely electrically by electric motor 1, which is switched in a motor-driven manner, and by the energy stored in high voltage battery 11. If an energy need exists which electric motor 1 is no longer able to meet by itself, internal combustion engine 3 is automatically cranked and coupled to the drivetrain, which takes place by engaging separating clutch 4. Internal combustion engine 3 now contributes to driving the hybrid vehicle.

Figure 2:
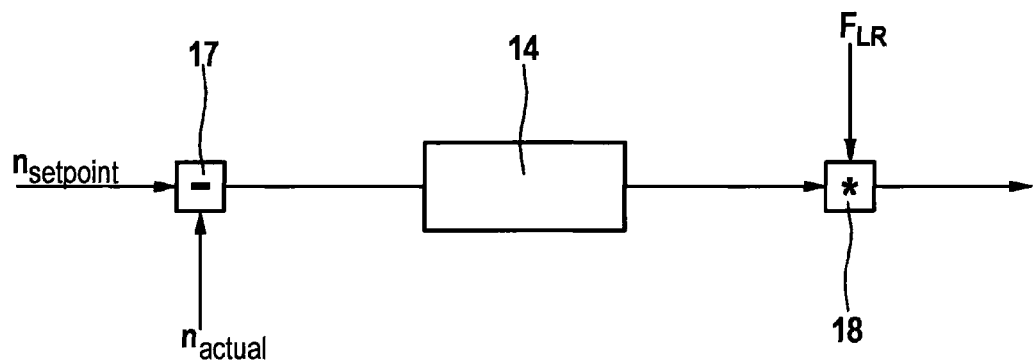
FIG. 2 shows an exemplary embodiment for a controlled system according to the present invention.

In the idle mode of the hybrid vehicle, a minimum rotational speed is set. It is assumed that separating clutch 4 is engaged, and the hybrid vehicle is driven jointly by electric motor 1 and internal combustion engine 3. As is apparent from FIG. 2, a setpoint rotational speed $n_{setpoint}$ which is to be implemented in the case of missing driver's input and, for example, lies between 800 and 900 revolutions per minute is guided to an adder 17 at which an actual rotational speed $n_{actual}$ having the opposite sign is also applied. This actual rotational speed $n_{actual}$ is detected with the aid of a rotational speed sensor 16 which is situated opposite drive shaft 2 at the output of electric motor 1 and reports the detected idle rotational speed to control unit 13 and idle speed controller 14 situated therein. Here, it is assumed that adder 17 is an integral part of idle speed controller 14.

The rotational speed difference which is output by adder 17 to idle speed controller 14 is evaluated by idle speed controller 14. In the present case, idle speed controller 14 is a PID controller which has a proportional transmission element, an integral transmission element, and a differential transmission element. Each of these transmission elements is set through an intensification factor which is selected as a function of the difference signal supplied by adder 17, whereby all three transmission elements contribute to the control. The output quantities of the proportional, the integral, and the differential transmission elements are added and form an output signal of the controller which is multiplied by idle speed control factor $F_{LR}$ in multiplier 18. Idle speed control factor $F_{LR}$ takes into account the power output of electric motor 1 which is provided by the electric motor at the point in time of the particular control loop. Through multiplying idle speed control factor $F_{LR}$ by the output signal of idle speed controller 14, each of the intensification factors of the proportional, the integral, and the differential transmission elements is influenced in the same manner by idle speed control factor $F_{LR}$. The output signal of idle speed controller 14 multiplied by idle speed control factor $F_{LR}$ is then supplied to the controlled system, which includes the drivetrain having internal combustion engine 3 and electric motor 1, electric motor 1 and internal combustion engine 3 counteracting the instantaneous idle rotational speed during the generation of the desirable idle rotational speed in order to guide the difference between setpoint value $n_{setpoint}$ and actual value $n_{actual}$ toward zero.

Figure 3:
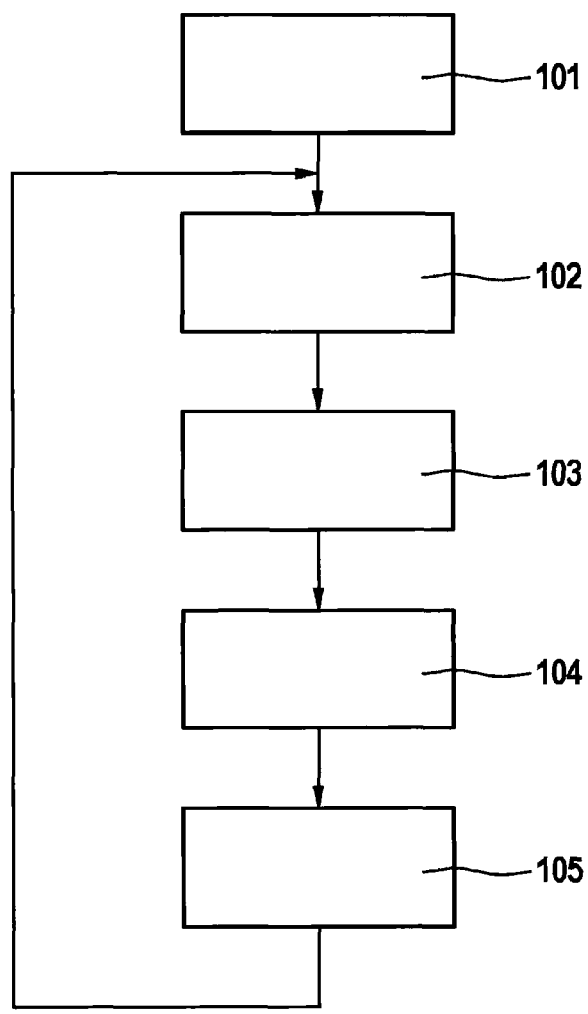
FIG. 3 shows a schematic flow chart for an exemplary embodiment of the method according to the present invention.

One possible specific embodiment of the method according to the present invention is explained with the aid of FIG. 3. First, an idle speed control factor $F_{LR}$ is determined in block 101. This takes place during an application phase in which the transmission characteristic of the controlled system is determined, which includes electric motor 1, outputting 100% of its power output, and internal combustion engine 3. Based on the interferences fed forward, such as switching on the mechanical air conditioner, driving uphill, or activating the brake, the intensification of the idle speed control is adapted in such a way that the output signal of the idle speed control does not oscillate. In this way, the intensification factors of the proportional, the integral, and the differential transmission elements are determined. The transmission characteristic of the controlled system changes to the same extent that the transmission characteristic of the controlled system deteriorates due to a power drop of electric motor 1. To take this power drop of electric motor 1 into account, a linear correlation between the torque of electric motor 1, which represents the power output of electric motor 1, and idle speed control factor $F_{LR}$ is determined. If electric motor 1 works at full power, i.e., the torque of electric motor 1 is fully available, idle speed control factor $F_{LR}$ equals 1. If the torque of electric motor 1 is available only to a limited extent, the idle speed control factor is 0.7, while the idle speed control factor is 0.5 if the torque of electric motor 1 fails entirely. Intermediate values then result from the described linear characteristics curve.

After determining idle speed control factor $F_{LR}$, the torque of electric motor 1 is continuously measured in block 102 with the aid of a torque sensor 15, which is situated on electric motor 1 and supplied to control unit 13. In block 103, control unit 13 then evaluates the measured torque and determines, based on the characteristics curve obtained in block 101, idle speed control factor $F_{LR}$, which is then multiplied by the output signal of PID controller 14 in block 104. The multiplied output signal is output to the controlled system in block 105. The control is thus adapted to the instantaneous transmission characteristics of the controlled system. In this way, it is achieved that the entire control loop always achieves an optimal balance of dynamics and stability. The control process is then restarted in block 102.

It is, however, also possible that, instead of the linear characteristics curve determined in block 101, a multidimensional characteristics map is taken into account when determining idle speed control factor $F_{LR}$. For this purpose, control unit 13, in particular idle speed controller 14, needs additional input signals which identify a power drop of electric motor 1. The temperature of electric motor 1 or the available battery current of high-voltage battery 11 supplying electric motor 1 may be used as an input variable. The lower the current is, which is provided by the high-voltage battery, the lower is the torque of electric motor 1. However, the torque of electric motor 1 is reduced when the temperature of electric motor 1 increases. Thus, these two input variables already represent an early indicator for a decreasing power standby of electric motor 1 which are taken into account in the idle speed control.

What is claimed is:

1. A method for controlling idle speed in a hybrid vehicle in which at least two power plants contribute together or separately to driving the hybrid vehicle, the method comprising:
    comparing a setpoint value to an actual value for controlling the idle speed; and
    setting a setpoint rotational speed as a function of the comparison by changing at least one intensification factor of the control;
    wherein the idle speed control is carried out simultaneously by the at least two power plants, the at least one intensification factor being continuously adapted to power output of a first of the two power plants, and wherein the intensification factor is applied with an idle speed control factor for controlling the idle speed.

2. The method as recited in claim 1, wherein the idle speed control includes multiple intensification factors, one of the intensification factors being continuously adapted to the power output of the first of the two power plants.

3. The method as recited in claim 2, wherein the idle speed control includes a proportionally active transmission element, an integrally active transmission element, and a differentially active transmission element, one independent intensification factor being provided for each transmission element.

4. The method as recited in claim 1, wherein all intensification factors are simultaneously continuously adapted to the power output of the first of the two power plants.

5. The method as recited in claim 1, wherein the idle speed control factor is smaller when the power output of the first of the two power plants is lower.

6. The method as recited in claim 1, wherein the intensification factor is multiplied by the idle speed control factor for controlling the idle speed.

7. The method as recited in claim 1, wherein the idle speed control factor decreases linearly with the power output of the first of the two power plants.

8. The method as recited in claim 1, wherein the idle speed control factor results from a characteristics curve which includes an instantaneously maximally available power output of the first of the two power plants as the input value.

9. The method as recited in claim 1, wherein the two power plants include an internal combustion engine and an electric motor, and a power output of the electric motor varies.

10. The method as recited in claim 9, wherein an instantaneously available torque of the electric motor is measured as available power output, and the idle speed control factor is determined as a function of the instantaneously measured torque.

11. The method as recited in claim 9, wherein at least one of a temperature of the electric motor, and an instantaneously available current of a high voltage battery supplying the electric motor, is used as an input value of a characteristics curve.

12. A device for controlling idle speed in a hybrid vehicle in which at least two power plants contribute together or separately to driving the hybrid vehicle, and a setpoint value is compared to an actual value for controlling the idle speed, the setpoint value being set as a function of the comparison by changing at least one intensification factor of the control, the device comprising:

an arrangement which allows control of the idle speed to be carried out simultaneously by the at least two power plants, the arrangement being configured to continuously adapt the at least one intensification factor of the control to the power output of a first of the two power plants, and wherein the intensification factor is applied with an idle speed control factor for controlling the idle speed.

13. The device as recited in claim 12, wherein the arrangement includes an idle speed controller which jointly carries out the control of the idle speed of the first and the second power plants.

14. The device as recited in claim 13, wherein the idle speed controller is a PID controller.

15. The device as recited in claim 13, wherein the idle speed controller is an integral part of a control unit which measures a power output of the first of the two power plants, whose power output varies.

16. The device as recited in claim 15, wherein the first power plant, whose power output varies, includes an electric motor, and the second power plant is an internal combustion engine.

* * * * *